(12) United States Patent
Albrecht

(10) Patent No.: US 12,247,387 B1
(45) Date of Patent: Mar. 11, 2025

(54) PROTECTIVE COVER FOR DRAIN SNAKES

(71) Applicant: H. V. Albrecht, Wellington, FL (US)

(72) Inventor: H. V. Albrecht, Wellington, FL (US)

( * ) Notice: Subject to any disclaimer, the term of this patent is extended or adjusted under 35 U.S.C. 154(b) by 0 days.

(21) Appl. No.: 18/737,976

(22) Filed: Jun. 8, 2024

(51) Int. Cl.
*E03C 1/302* (2006.01)
*E03F 9/00* (2006.01)
*F16L 57/00* (2006.01)

(52) U.S. Cl.
CPC .............. *E03F 9/002* (2013.01); *E03C 1/302* (2013.01); *E03C 2201/00* (2013.01); *E03F 2201/00* (2013.01); *F16L 57/00* (2013.01)

(58) Field of Classification Search
CPC .............. F16L 3/00; F16L 57/00; F16L 57/06
USPC .............. 138/109, 110, 118, 118.1, 161, 121
See application file for complete search history.

(56) References Cited

U.S. PATENT DOCUMENTS

| | | | | | |
|---|---|---|---|---|---|
| 1,822,624 | A | * | 9/1931 | Hoeftmann | H01B 7/20 174/136 |
| 4,415,764 | A | * | 11/1983 | Priaroggia | H02G 9/02 174/136 |
| 4,643,229 | A | * | 2/1987 | Hickin | F16L 11/118 138/121 |
| 5,203,378 | A | * | 4/1993 | Williams | F16L 11/20 138/104 |
| 5,353,843 | A | * | 10/1994 | Hoag | F16L 57/00 138/104 |
| 5,651,161 | A | * | 7/1997 | Asta | A47L 9/24 15/325 |
| 5,901,756 | A | * | 5/1999 | Goodrich | F16L 3/233 248/205.2 |
| 5,904,183 | A | * | 5/1999 | Leech | B60R 15/00 137/355.16 |
| 6,223,767 | B1 | * | 5/2001 | Otis | B60R 13/07 137/355.16 |
| 7,640,620 | B2 | * | 1/2010 | Stockton | A47L 9/0063 138/119 |
| 11,268,646 | B2 | * | 3/2022 | Gronvold | F16L 57/02 |
| 2009/0260705 | A1 | * | 10/2009 | Ainsworth | F16L 57/00 138/167 |

* cited by examiner

*Primary Examiner* — Patrick F Brinson
(74) *Attorney, Agent, or Firm* — Donald Debelak

(57) ABSTRACT

Protective covers made of protective material to prevent twisting and kinking of associated apparatus used for clearing obstructions in pipes or other cavities (the apparatus also commonly referred to as drain snakes) are disclosed. The cover bodies encircle the apparatus with an entry opening, closest point to the where the apparatus is coming from when the apparatus is moving toward the drain, and an exit opening, where the apparatus leaves the protective cover and moves toward or into the part being cleaned, which could be a drain, pipe or other part that material flows through. The entry and exit openings could be a section of the protective cover or they could be a separate attachable part. The protective cover body may have a handle, and may be rigid or flexible, with an option to have accordion like flexibility.

13 Claims, 4 Drawing Sheets

PROTECTIVE COVER FOR DRAIN SNAKES

BACKGROUND

Drain/sewer snakes or cables are typically from 25-100 feet long and are generally stored in a manual or powered containment. This snake or cable is then fed from the containment into various pipes and drains that are generally below ground or under buildings. The snake or cable typically has some type of auger, cutter head or other element attached at the end that further clears or breaks through obstructions. The snake or cable containment device is usually several feet from the entrance to the sewer pipe or drain and it is, in this distance, that the snake or cable may twist or kink when the device at the end of the snake or cable encounters the obstruction and cannot continue, thus when the stored energy from the twisting and/or kinking is released, the snake drain or cable may catch the hand or other body part of the operator. Heavy gloves are usually worn to protect the operator from this, however these gloves are then caught in the twist or kink as well. Many users, especially those less skilled in the use of these clearing mechanisms have been injured in this way. This invention protects the operator from injury while further preventing the twisting and/or kinking of the snake or cable.

Many devices have been invented and produced to enable the removal of obstructions and cleaning of various exterior drain or sewer pipes. Generally these drain or sewer pipes are below the ground and are accessed via a clean out or access opening, then further by a vertical or slanted pipe with the extended pipe constructed more horizontally from the origination into a further and usually larger main pipe. Obstructions may occur for various reasons anywhere along this pipe network. The obstructions may be fairly solid, such as encroaching tree roots, or clogging, items, such as mud, paper, waste, etc. When the obstruction is solid or semi-solid, then clearing devices such as augers and cutting tool's actions could be reduced or caught and while the rotating forward motion of the snake or cable continues, the snake or cable itself then begins to back up, twist and/or kink, potentially catching the hand or other body part causing injury to the operator, even if wearing heavy gloves.

SUMMARY OF THE INVENTION

This invention discloses protective cover(s) made of protective material to prevent twisting and kinking associated with the apparatus used for clearing obstructions in pipes or other cavities (the apparatus also commonly referred to as drain snakes). The protective cover(s) encircle the apparatus with an entry opening, closest to the point where the apparatus is coming from (containment), to the exit opening, where the apparatus leaves the protective cover(s) and moves toward or into the part being cleaned, which could be a drain, pipe, or other part that material flows through. The entry opening could be part of the protective cover or it could be a separate attachable part. The exit opening's size is chosen based upon the size of the drain opening that the apparatus will enter, and also may be based on the size of the cutting device attached at the end of the apparatus. The exit opening could be part of the protective cover or it could be a separate attachable part. One protective cover may be lengthened by inserting a second protective cover's entry opening into the exit opening of the protective cover being lengthened.

The protective cover body may have a handle. All or part of the protective cover may be rigid or flexible, with an additional option to have accordion like flexibility. The object of the invention is to prevent injuries after the twisting and kinking of the drain snake causes the drain snake or cable to release its stored energy with a violent movement, the twisting and kinking sometimes caused by the drain snake or cable catching on, or otherwise hindered by a difficult to remove obstruction.

DESCRIPTION OF THE DRAWINGS

The drawings represent examples of the various protective covers that are covered by this application. Other configurations are also possible.

Figure 1:
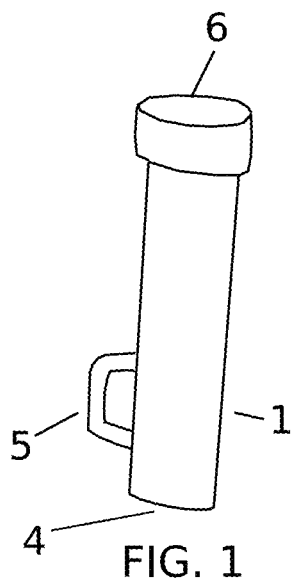
FIG. 1 shows a protective cover 1 with an entry opening 4, a handle 5, and with an extended exit opening 6, which could be a part of the protective cover or it could be a separate attachable part.
Figure 2:
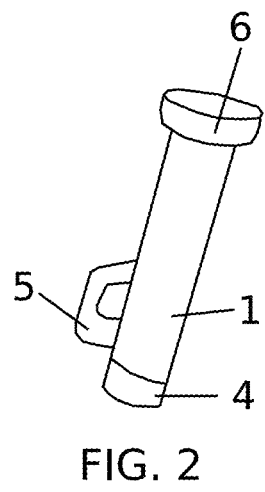
FIG. 2 shows a protective cover 1 with a handle 5, an extended exit opening end 6 which could be a part of the protective cover or it could be a separate attachable part, and a flexible entry opening end 4 that is opposite the exit opening, which also could be a part of the protective cover, or it could be a separate attachable part.
Figure 3:
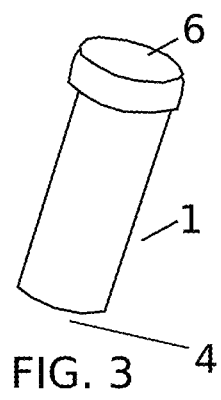
FIG. 3 shows a protective cover 1, with an entry opening 4, without the handle with an extended exit opening end 6, which could be a part of the protective cover or it could be a separate attachable part.
Figure 4:
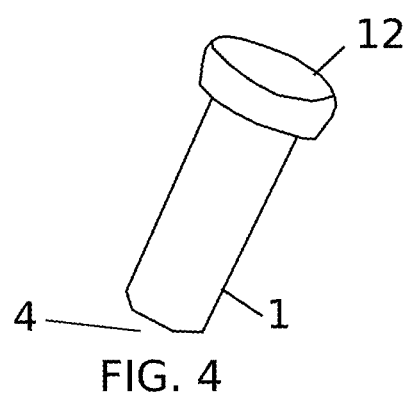
FIG. 4 shows a protective cover 1 with an entry opening 4, with an extra-large exit opening end 12 that could be a part of the protective cover or could be a separate attachable part.
Figure 5:
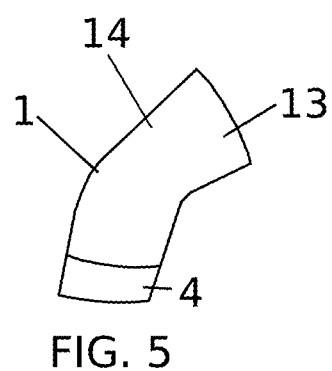
FIG. 5 shows a protective cover 1 with a larger exit opening end 13, also includes a flexible entry opening end 4 opposite of the exit opening.
Figure 6:
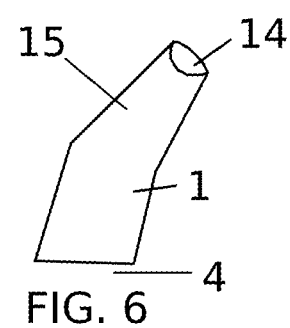
FIG. 6 shows a protected cover 1, with an entry opening 4 with a small exit opening end 14.
Figures 7, 8, 9:
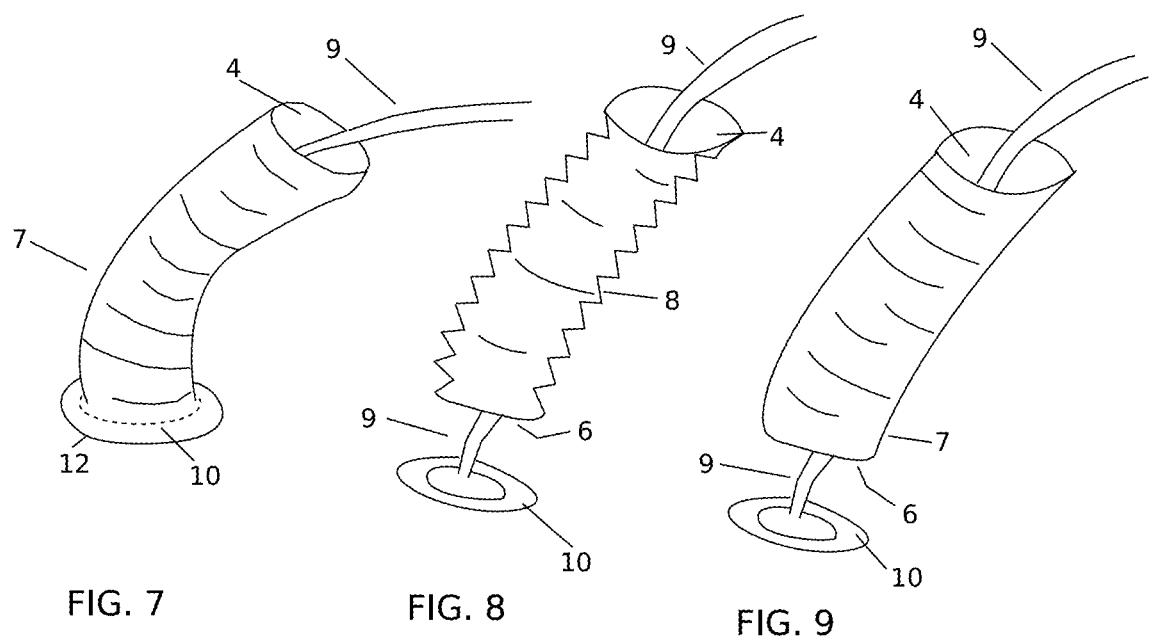
FIG. 7 shows a flexible protective cover 7, with an entry opening 4, with an extra-large exit opening 12 and how it sits on a drain opening 10 with the apparatus (drain snake or cable) 9.
FIG. 8 shows a protective cover with an accordion type construction 8 as it is being placed over the drain, pipe or other part opening 10 with the apparatus (drain snake or cable) 9 going through the entry opening end 4 of the protective cover with accordion type construction 8 to the drain after going through exit opening end 6. The sharp edges of the accordion feature could be replaced with rounded edges.
FIG. 9 shows a protective cover 7, with an entry opening 4 before being placed over the drain opening 10 with the apparatus (drain snake or cable) 9 running through the protective cover 7.
Figure 10:
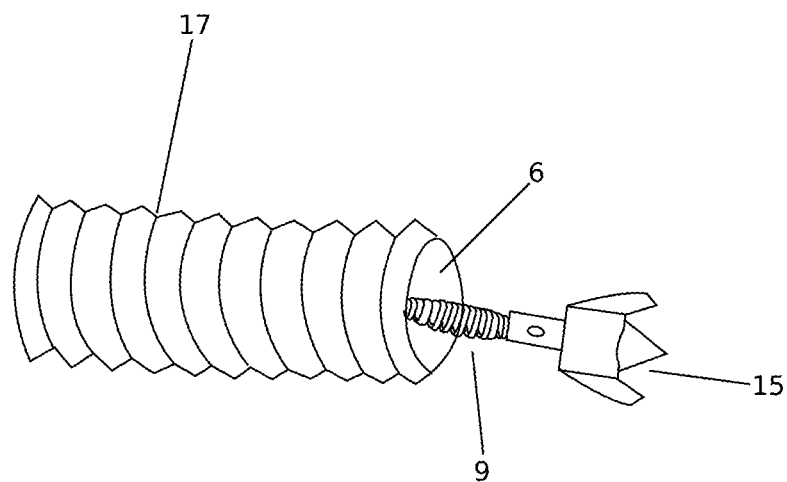
FIG. 10 shows a flexible protective cover with ridges 17 with an exit opening 6, with the apparatus (drain snake of cable) 9 and a drain clog cutting tool 15 exiting the device.

I claim:
1. A protective cover for drain snakes comprising:
a length of protective material;
an entry opening end having a diameter through which an auger cutter head is inserted into the protective cover;
an exit opening end having a diameter through which the auger cutter head exits the protective cover;
wherein the exit opening end diameter is, wider than both the entry opening end diameter and the diameter of the protective cover;

wherein the exit opening end is configured to fit over a drain, pipe, or other device through which material flows such that the auger cutter head may enter in order to clear an obstruction.

2. The protective cover of claim 1 wherein protective material is composed of a rigid material.

3. The protective cover of claim 1 wherein the protective material is composed of a flexible material.

4. The protective cover of claim 3, wherein the flexible material has an accordion type construction.

5. The protective cover of claim 1 wherein the entry opening end has a rigid construction and is a part the protective material.

6. The protective cover of claim 1 wherein the entry opening end has a flexible construction and is a part of the protective material.

7. The protective cover of claim 1 wherein the entry opening end has a rigid construction and is an attachable part to the protective material.

8. The protective cover of claim 1 wherein the entry opening end has a flexible construction and is an attachable part to the protective material.

9. The protective cover of claim 1 wherein the exit opening end has a rigid construction.

10. The protective cover of claim 1 wherein the exit opening end has a flexible construction.

11. The protective cover of claim 1 wherein the exit opening end has a rigid construction and is an attachable part to the protective material.

12. The protective cover of claim 1 wherein the exit opening end has a flexible construction and is an attachable part to the protective material.

13. The protective cover of claim 1, wherein the protective material includes a handle attached thereto.

* * * * *